No. 857,165. PATENTED JUNE 18, 1907.
F. EICHBERG.
MOTOR CONTROL.
APPLICATION FILED JAN. 11, 1905.
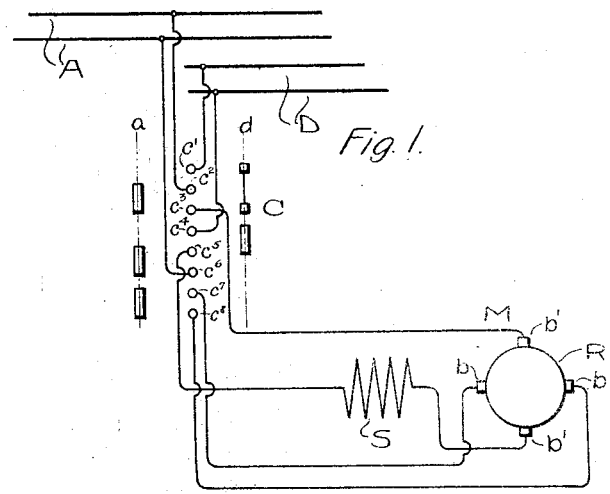
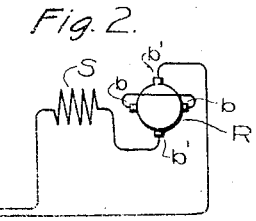
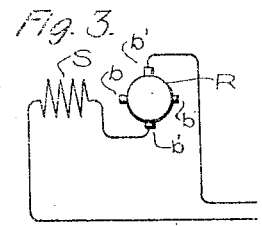
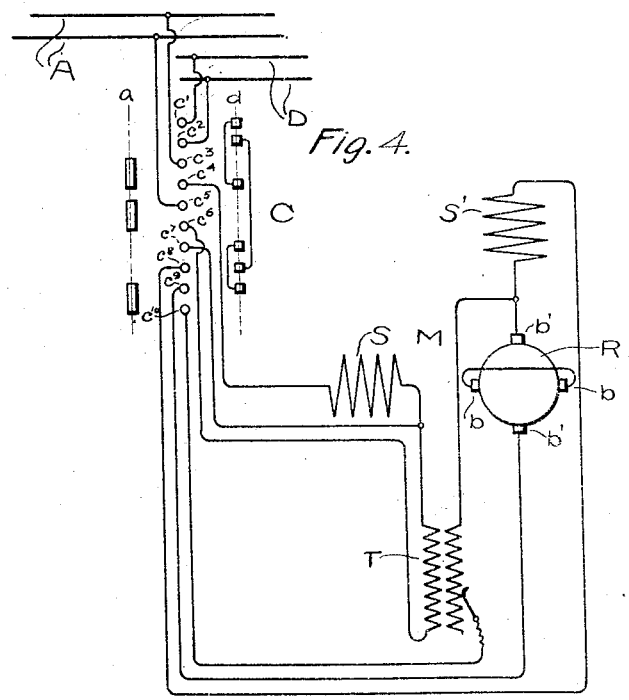
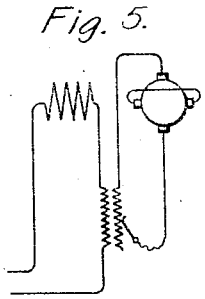
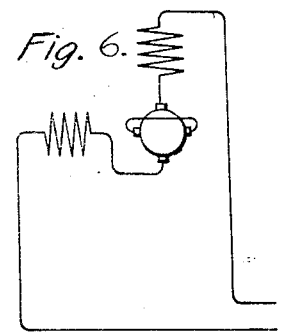
Witnesses:
Harold F. Locke.
Arlen Orford
Inventor:
Friedrich Eichberg.
by Albert G. Davis
Att'y.

ically-operated vehicle.
UNITED STATES PATENT OFFICE.

FRIEDRICH EICHBERG, OF BERLIN, GERMANY, ASSIGNOR TO GENERAL ELECTRIC COMPANY, A CORPORATION OF NEW YORK.

MOTOR CONTROL.

No. 857,165.  Specification of Letters Patent.  Patented June 18, 1907.

Application filed January 11, 1905. Serial No. 240,551.

*To all whom it may concern:*

Be it known that I, FRIEDRICH EICHBERG, a subject of the Emperor of Austria, residing at Berlin, in the Empire of Germany, have invented certain new and useful Improvements in Motor Control, of which the following is a specification.

My invention relates to the control of alternating current commutator motors of a type disclosed in a former application, Serial No. 146,692, filed by Gabriel Winter and myself March 7, 1903, and its object is to provide means whereby such motors may be operated efficiently on either alternating or direct current.

The type of motor to which I refer, as disclosed in the above mentioned application, comprises a stator winding and a rotor winding provided with a commutator and two sets of brushes. One set of brushes short-circuits the rotor winding on the line of magnetization produced by the stator winding, while the other set is connected in series with the stator winding, either directly or through a transformer, and supplies the magnetizing current to the rotor winding. The field produced by this magnetizing current coacting with the currents in the stator winding and the rotor short-circuit produces the motor torque.

It is sometimes important that it should be possible to operate motors both on alternating and direct current as, for instance, in the case of an electrically-operated vehicle.

My invention consists in providing means for connecting a motor, which is connected for operation on alternating current as above described, so as to secure efficient operation on direct current.

When operating on direct current the stator winding and the brushes, which in alternating current operation supply the magnetizing current, are connected directly in series with the direct current source, and the flow of current through the rotor short-circuit is prevented. The stator winding then acts as the field, and the rotor, with its brushes displaced 90 degrees from the field, as the armature of an ordinary direct current series motor. That the motor is particularly adapted for efficient operation, with the respective connections as set forth above, both on alternating and direct current, is evident from the following considerations: In an alternating current motor, in order that the power factor should be high, it is well understood in the art that the magnetizing ampere turns should be small as compared with the ampere turns carrying energy current, while in a direct current motor for efficient operation it is essential that the field ampere turns should be great as compared with the armature ampere turns.

When the motor is connected for alternating current operation, the stator winding carries the energy current, while the armature brushes displaced 90 degrees therefrom carry the magnetizing current. Consequently, for efficient operation the stator ampere turns should be great as compared with the rotor ampere turns. Since in direct current operation the stator acts as the field and the rotor as the armature, the proportion of stator and rotor ampere turns adapted to give efficient operation on alternating current is exactly the proportion desirable for direct current operation.

My invention will best be understood by reference to the accompanying drawings, in which Figure 1 shows diagrammatically a motor of the commutator type provided with a controlling switch arranged in accordance with my invention for connecting the motor for operation on either alternating or direct current; Figs. 2 and 3 are diagrams of the connections obtained when the controlling switch of Fig. 1 is in its two positions; Fig. 4 shows a modified arrangement of the controlling switch; and Figs. 5 and 6 are diagrams showing the circuit connections obtained by the controlling switch of Fig. 4.

Referring first to Fig. 1, M represents the motor which comprises the stator winding S and the rotor winding R provided with two sets of commutator brushes, one set, $b$ $b$, arranged on the line of the stator field, and the second set, $b'$ $b'$, displaced 90 electrical degrees therefrom. A represents a source of alternating current, and D a source of direct current. C represents a controlling switch by means of which the motor is connected to either source.

When the controlling switch is moved to bring the movable contacts on the dotted line $a$ into engagement with the stationary contacts, a circuit is completed as follows: from the lower line-wire A, contact $c^6$, contact $c^5$, stator S, lower brush $b'$, upper brush $b'$, contact $c^3$, contact $c^2$, to upper line-wire A. The brushes $b\ b$ on the line of the stator field are electrically connected through the contacts $c^7$ and $c^8$. The stator winding S and the brushes $b'\ b'$ are thus connected in series with the source, while the brushes $b\ b$ short-circuit the rotor on the line of the stator field. This is the connection for alternating current operation, as set forth in the former application referred to above. These connections are shown diagrammatically in Fig. 2.

If the controlling switch C is moved to bring the movable contacts on the line $d$ into engagement with the stationary contacts, a circuit is closed from lower line-wire D, contact $c^4$, contact $c^5$, stator winding S, through brushes $b'$, contact $c^3$, contact $c^1$, to upper line-wire D. The brushes $b\ b$ are open-circuited. This connection is shown in Fig. 3. The motor is thus connected as an ordinary series motor and a flow of current between the brushes $b\ b$, due to the electromotive force produced in the rotor winding by its rotation in the field produced by the armature current, is prevented by breaking the electrical connection between these brushes.

As has been pointed out heretofore, if the rotor ampere turns are made small in proportion to the stator ampere turns, the connection shown in Fig. 2 will give efficient operation on alternating current, since the stator winding carries the energy currents, while the rotor winding between the brushes $b'\ b'$ carries the magnetizing currents. Also with the connection of Fig. 3, the field ampere turns will be strong compared to the armature ampere turns, and efficient operation as a direct current motor is obtained.

It is sometimes desirable in operating a motor on alternating current to connect the brushes $b'\ b'$ in series with the stator winding through a series transformer instead of directly, either to obtain a speed regulation by varying the ratio of transformation of the transformer or to render it possible to operate the motor on a higher voltage than could be impressed on the commutator. In such a case, the transformer must evidently be cut out of circuit when the motor is operated on direct current. Furthermore, in the case of large motors with the rotor wound for low voltages, and consequently a high current capacity, it is sometimes inconvenient to lead the connections from the short-circuiting brushes $b\ b$ to the controlling switch, particularly if the controlling switch is placed at some distance from the motor. In such a case it is necessary to provide other means than breaking the short circuit for preventing current-flow between these brushes when the motor is operated on direct current. Both of the above modifications are shown in the arrangement of Fig. 4. In this figure a series transformer T is provided for connecting the brushes $b'\ b'$ in series with the stator winding S, and an auxiliary stator winding S' is provided for inducing an electromotive force in the rotor winding between the short-circuiting brushes $b\ b$, which is equal and opposite to that induced by the field produced by the armature current; or, in other words, the ampere turns of the auxiliary winding S' neutralize the rotor ampere turns between the brushes $b'\ b'$. The circuits with this arrangement are as follows: When the controlling switch C is moved to bring the movable contacts on the line $a$ into engagement with the stationary contacts, a circuit is closed from upper line-wire A, contact $c^3$, contact $c^4$, through stator winding S, through the primary of transformer T, contact $c^6$, contact $c^5$, to lower line-wire A. A circuit is also completed from the upper terminal of the secondary of transformer T to upper brush $b'$, lower brush $b'$, contact $c^9$, contact $c^{10}$, to the lower terminal of the transformer secondary. The brushes $b'\ b'$ are thus placed in series with the stator winding S through the transformer T. The brushes $b\ b$ are permanently short-circuited independently of the controlling switch.

When the controlling switch C is moved to its other position, the following circuits are completed: from upper line-wire D, contact $c^1$, contact $c^4$, stator winding S, contact $c^7$, contact $c^9$, lower brush $b'$, upper brush $b'$, auxiliary stator winding S', contact $c^8$, contact $c^2$, to lower line-wire D. The stator winding S, the rotor brushes $b'\ b'$ and the auxiliary or compensating winding S' are all connected directly in series to the source and the transformer T is cut out of circuit. Since the compensating field S' is in series with the rotor, it will, if properly proportioned, neutralize the field produced by the rotor current for all loads on the motor. Consequently no electromotive force can be induced between the brushes $b\ b$ by the rotation of the motor, and the flow of current between these brushes, when the motor is operating on direct current, is prevented as effectually as if the electrical connection between these brushes were broken.

While for the sake of simplicity I have shown the motor diagrammatically, it will be understood that any well known form of construction may be employed. The stator winding is preferably a distributed winding disposed in slots on a laminated core, while the rotor is provided with a winding on the commutator similar to that of a direct current machine. The arrangement of the controlling switch, its contacts and connections may be moved as desired. Accordingly, I do not desire to limit myself to the particular construction and arrangement here shown, but aim in the appended claims to cover all modifications which are within the scope of my invention.

Furthermore it is obvious that for the purposes of my invention it makes no difference in operation on alternating current whether the rotor brushes are connected in series with the stator conductively or inductively through a transformer, and consequently when I employ the term "in series" in the appended claims, I desire it to be understood that I include both a direct series connection and an indirect series connection through a transformer.

What I claim as new and desire to secure by Letters Patent of the United States, is,—

1. In combination with an alternating current motor of the commutator type having two sets of commutator brushes, one on the line of the stator field and the second displaced 90 electrical degrees therefrom, means for connecting the stator winding and second set of brushes in series to an alternating current source and short-circuiting the first set of brushes, and means for connecting said stator winding and second set of brushes in series to a direct current source and preventing a flow of current between the brushes of the first set.

2. In combination with an alternating current motor of the commutator type having two sets of commutator brushes, one on the line of the stator field and the second displaced 90 electrical degrees therefrom, means for connecting the stator winding and second set of brushes in series through a transformer to an alternating current source and short-circuiting the second set of brushes, and means for connecting said stator winding and second set of brushes directly in series to a direct current source and preventing a flow of current between the brushes of the first set.

3. In combination with an alternating current motor of the commutator type having two sets of commutator brushes, one on the line of the stator field and the second displaced 90 electrical degrees therefrom, a transformer, means for connecting the stator winding of the motor and the primary of said transformer to an alternating current source, connecting the second set of brushes to the secondary of said transformer, and short-circuiting the first set of brushes, and means for connecting the stator winding and said second set of brushes in series to a direct current source, cutting said transformer out of circuit, and preventing a flow of current between the brushes of the first set.

In witness whereof, I have hereunto set my hand this twenty-first day of December, 1904.

FRIEDRICH EICHBERG.

Witnesses:
HENRY HASPER,
WOLDEMAR HAUPT.